US 8,454,486 B2

(12) United States Patent
Philippi et al.

(10) Patent No.: US 8,454,486 B2
(45) Date of Patent: Jun. 4, 2013

(54) TOOL-CHANGING SYSTEM FOR AN INDUSTRIAL ROBOT

(75) Inventors: Siegfried Philippi, Calw (DE); Stefan Meier, Sindelfingen (DE); Stefan Stroehlein, Schwaigern (DE)

(73) Assignee: IPR—Intelligente Peripherien fuer Roboter GmbH, Schwaigern (DE)

( * ) Notice: Subject to any disclaimer, the term of this patent is extended or adjusted under 35 U.S.C. 154(b) by 1295 days.

(21) Appl. No.: 12/229,901

(22) Filed: Aug. 27, 2008

(65) Prior Publication Data

US 2009/0075796 A1      Mar. 19, 2009

(30) Foreign Application Priority Data

Aug. 28, 2007    (DE) .......................... 10 2007 042 187

(51) Int. Cl.
*B23Q 3/155* (2006.01)
(52) U.S. Cl.
USPC ............... 483/16; 483/901; 483/59; 483/61
(58) Field of Classification Search
USPC ............... 483/901, 60, 61, 62, 16, 59, 54–57
See application file for complete search history.

(56) References Cited

U.S. PATENT DOCUMENTS

| | | | | |
|---|---|---|---|---|
| 4,046,263 A | * | 9/1977 | Cwycyshyn et al. | 414/744.3 |
| 4,310,958 A | * | 1/1982 | Balaud et al. | 29/26 A |
| 4,763,401 A | * | 8/1988 | Marinoni et al. | 483/10 |
| 4,819,320 A | * | 4/1989 | Cairns et al. | 483/7 |
| 4,831,714 A | * | 5/1989 | Babel et al. | 483/3 |
| 4,910,373 A | | 3/1990 | Fuse | |
| 4,996,753 A | * | 3/1991 | Jones | 29/26 A |

(Continued)

FOREIGN PATENT DOCUMENTS

| | | | |
|---|---|---|---|
| EP | 361373 A2 | * | 4/1990 |
| GB | 2 216 451 A | | 10/1989 |

(Continued)

OTHER PUBLICATIONS

Examination Report from German Patent Office dated Jun. 17, 2008 (2 pages).

(Continued)

*Primary Examiner* — Erica E Cadugan
*Assistant Examiner* — Jason L Vaughan
(74) *Attorney, Agent, or Firm* — Flynn, Thiel, Boutell & Tanis, P.C.

(57) ABSTRACT

Tool-changing system, storage device for this purpose and method for coupling a tool to a robot arm.

The invention relates to a tool-changing system for an industrial robot, with a robot-side coupling device (100) provided in a robot arm, with at least one tool (70a, 70b) couplable to the robot-side coupling device (100) and having a tool-side coupling device (76a, 76b), and with a storage device (10) for receiving the at least one tool (76a, 76b) in the non-coupled state. The invention relates, furthermore, to a storage device suitable for this purpose and to a coupling method which can be carried out by means of the tool-changing system.

According to the invention, the storage device comprises a base (12), securing means (32a, 32b) for securing the robot-side coupling device (100) and feeding means (50a, 50b) which are designed for generating a relative movement of the robot-side coupling device (100) and of the tool-side coupling device (76a, 76b) with respect to one another in a coupling direction (2).

Use for the coupling and uncoupling of tools to and from industrial robots.

9 Claims, 5 Drawing Sheets

U.S. PATENT DOCUMENTS

| | | | | |
|---|---|---|---|---|
| 5,038,012 | A | * | 8/1991 | Walter ........................ 219/69.15 |
| 5,111,573 | A | * | 5/1992 | Ito et al. ............................. 483/1 |
| 5,192,844 | A | * | 3/1993 | Todd et al. ................. 219/85.16 |
| 5,256,128 | A | | 10/1993 | Neumann |
| 5,277,688 | A | * | 1/1994 | Whittington et al. ........... 483/33 |
| 5,342,161 | A | * | 8/1994 | Shimoichi et al. ....... 414/416.01 |
| 5,372,567 | A | * | 12/1994 | Whittington et al. ........... 483/29 |
| 5,380,117 | A | * | 1/1995 | Buschulte .................... 403/323 |
| 5,807,221 | A | | 9/1998 | Yi |
| 6,569,070 | B1 | * | 5/2003 | Harrington et al. ................ 483/1 |
| 7,442,155 | B2 | * | 10/2008 | Ou et al. ......................... 483/59 |

FOREIGN PATENT DOCUMENTS

| | | | |
|---|---|---|---|
| JP | 58177248 | A  * | 10/1983 |
| JP | 1-234188 | | 9/1989 |
| JP | 03161233 | A  * | 7/1991 |

OTHER PUBLICATIONS

European Patent Office Search Report dated Dec. 9, 2008 (7 pages).
Toenshoff H K et al: "Robuste Werkzeugwechsel—Vorrichtungen Fuer Industriroboter" VDI Z, Springer VDI Verlag, Dusseldorf, DE, Bd. 137, Nr. 9, Sep. 1, 1995 (3 pages).

* cited by examiner

TOOL-CHANGING SYSTEM FOR AN INDUSTRIAL ROBOT

FIELD OF USE AND PRIOR ART

The invention relates to a tool-changing system for an industrial robot, with a robot-side coupling device provided on a robot arm, with at least one tool couplable to the robot-side coupling device and having a tool-side coupling device, and with a storage device for receiving the at least one tool in the non-coupled state.

Industrial robots are generally known from the prior art. They are used, in particular, in manufacture and may expediently be used particularly for tasks in which work steps always recurring identically are to be carried out. Industrial robots of this type usually have tools which can be moved and handled via a robot arm and by means of which the assigned tasks of the industrial robot can be performed. These tools depend on the intended use of the industrial robot. The particularly common types of industrial robot include welding robots and lacquering robots. However, the discharge of pasty media, such as, for example, PVC, for the liquid-tight connection of metal sheets is also possible by means of industrial robots.

In order, in industrial robots of this type, to make it possible to have an increased amount of flexibility with regard to the work steps which can be carried out by them, the tools of these industrial robots may be configured so as to be exchangeable. For this purpose, both on a robot arm of the robot and on the tool, coupling devices are provided, which can be transferred into a coupled and an uncoupled state, in order to connect the tool to the robot or to release it from the latter. In the unused state, the tools may be arranged in a tool store designed as a tool magazine.

In the simplest instance, the change of the tool may take place manually. However, there are also changing systems in which the change is carried out in that either the tool is moved up to the robot arm or the robot arm is moved up to the tool, and subsequently, in the correspondingly positioned state, automatic coupling takes place.

OBJECT AND SOLUTION

The object of the invention is to develop a generic tool-changing system for an industrial robot to the effect that it allows an especially reliable tool change, particularly even in the case of robots or coupling devices in which, for coupling, a considerable joining force has to be applied in the coupling direction.

This object is achieved by means of a generic tool-changing system which, according to the invention, is developed to the effect that the storage device comprises a base, securing means for securing the robot-side coupling device and feeding means which are designed for generating a relative movement of the robot-side coupling device and of the tool-side coupling device with respect to one another in a coupling direction.

The storage device may be designed as a unitary subassembly, in which the base, to which the securing means and feeding means are assigned, is formed, for example, by a storage stand. The securing means and the feeding means may be provided on this storage stand. However, in the simplest instance, the base may also be formed by a hall floor of a machine hall. The securing means are designed in such a way that, for the purpose of a tool change, they can fix the robot-side coupling device in a defined position with respect to the tool. For this purpose, they do not have to engage directly on the robot-side coupling device, but, for example, can also fix the robot arm at a location spaced apart from the coupling device. What is achieved by the securing means is that the forces acting on the robot-side coupling device during a coupling operation do not have to be absorbed, or not solely, by securing the robot foot, for example, to the hall floor. Instead, the force flux takes place at least partially from the robot-side coupling device as far as that point on the robot arm at which the latter is secured by the securing means, and from there into the base of the storage device.

The securing means may be designed such that they fix the robot arm and/or the robot-side coupling device with respect to all three degrees of translational freedom. Normally, however, it is sufficient for the securing means to be designed for securing the robot-side coupling device in the coupling direction. Such a configuration, in which the securing means are designed only for securing with respect to one or two degrees of freedom, may be advantageous in certain cases, since it is thereby possible to utilize the third degree of freedom, preferably the vertical movement, in order to introduce the robot arm into the securing means. In connection with this invention, the coupling direction is considered to be the direction which is predetermined by the configuration of the coupling devices and in which the robot-side and the tool-side coupling device have to be moved in order to reach the state in which they bear one against the other.

The feeding means serve for the relative movement of the robot-side and tool-side coupling devices with respect to one another. The feeding means may comprise a simple mounting which moves the tool or the robot-side coupling device in relation to the base. The feeding means which are more complex and are likewise covered by the invention may also allow movements in a plurality of degrees of freedom and, in an extreme case, themselves be designed as a robot or pivoting arm which guides the tool up to the robot-side coupling device.

The relative movement, to be implemented by the feeding means, between the robot-side coupling device and the tool-side coupling device may be achieved in that the robot-side coupling device is moved in relation to the base, while the tool, together with the tool-side coupling device, remains in a fixed position with respect to the base. In such a case, the securing means and feeding means are combined in such a way that, by the feeding means, securing in relation to the base is also moved, while the robot-side coupling device secured by the feeding means is carried along. A configuration is preferred, however, in which the securing means are designed for the base-fixed securing of the robot-side coupling device and the feeding means are designed for moving the tool in relation to the base. This constitutes a structurally simple solution, since, after the securing of the robot-side coupling device, the latter can remain in a fixed position, together with all other separately movable sections of the robot, and does not have to be moved during the feed. Instead, after the base-fixed securing of the robot-side coupling device, the tool and consequently the tool-side coupling device are guided up to the robot-side coupling device. The force introduced into the robot-side coupling device by the tool being pressed onto the latter can then be diverted via the base-fixed securing means into the base, that is to say, for example, a storage stand or the hall floor.

The feeding means preferably comprise a feed slide which is preferably designed, in particular, for a linear movement. The feed slide in this case forms a support, on which the robot arm, together with the robot-side coupling device, or preferably the tool, together with the tool-side coupling device, rests and by means of which these can be moved. The configuration in which the feed slide can be moved by means of a linear movement can be implemented in a structurally simple way and is cost-effective. In a configuration with a storage device for a plurality of tools, in this case a separately movable feed slide is preferably provided in each case for each tool. The feed slide may be operated, for example, electrically, hydraulically or pneumatically. A configuration is preferred in which the feed slide can be moved via a pneumatic cylinder.

In a development of the invention, the securing means and the robot-side coupling device have elevations and recesses corresponding to one another, in particular fixing pins and fixing bores corresponding to one another, which make it possible to insert the robot-side coupling device onto the securing means in an insertion direction deviating from the coupling direction.

The configuration with elevations and recesses is in this case such that the coupling device or part of the robot arm is designed at least partially as a negative image of a shape of a section of the securing means. A positive interengagement of the securing means with the robot arm or the robot-side coupling device is thereby achieved. The securing means can thus assume their securing function, without the need for movements which go beyond the movement of the robot arm. Securing simply takes place solely by the robot arm being positioned in its securing position. The elevations and recesses are preferably oriented in such a way that the robot-side coupling device can be placed vertically onto the securing means, thus resulting in a positive connection acting in the horizontal direction, in particular in the coupling direction. The use of fixing pins and fixing bores is particularly advantageous, the fixing pins preferably being provided on the securing means and the fixing bores preferably being provided on the robot-side coupling device. In the simplest instance, even one fixing pin and one fixing bore are sufficient. A configuration is preferred, however, with a plurality of fixing pins and fixing bores which are formed parallel to one another, so that a twisting of the robot-side coupling device with respect to the securing means is also prevented. Implementation via fixing pins and fixing bores constitutes a particularly cost-effective and reliable solution. By the fixing pins being configured with a conical shape, in addition, especially high precision in the relative position of the securing means and of the robot-side coupling device can be achieved. Instead of a conical shape, cylindrical fixing pins with a chamfer may also be used. The positively acting recesses and elevations, in particular the fixing pins and fixing bores, preferably form a narrow clearance fit.

Similarly, in a development of the invention, the feeding means and the tool have elevations and recesses corresponding to one another, in particular fixing pins and fixing bores corresponding to one another, which make it possible to insert the tool onto the feeding means in an insertion direction deviating from the coupling direction. The tool, which is mounted on the feeding means, can thus be held in its desired position. These fixing pins and fixing bores, too, are preferably oriented vertically, so that the tool can be released upward from the feeding means solely as a result of a vertical movement. This vertical movement is possible by the tool being coupled to the robot arm and by the robot arm subsequently being raised. It is particularly advantageous if the elevations and recesses which are assigned to the feeding means and to the securing means allow an insertion and a disengagement of the robot-side coupling device and of the tool in the same direction in each case, since it thereby becomes possible that the robot-side coupling device having the coupled tool can in this direction at the same time make or release a positive connection to the securing means and feeding means.

In a development of the invention, the robot-side coupling device or the tool-side coupling device has a coupling extension extending in the coupling direction, and the tool-side coupling device or the robot-side coupling device has a coupling recess which is open in the coupling direction and which is provided for receiving the coupling extension. The coupling devices are accordingly designed such that they have a coupling extension and a coupling recess, the coupling extension and the coupling recess being arranged and formed in such a way that the coupling extension can move into the coupling recess during the coupling operation.

As a result, on the one hand, a positive connection of the coupling devices transversely to the coupling direction is made and, on the other hand, a coupling extension of this type and a coupling recess of this type are highly suitable for subsequently making a positive connection in the coupling direction.

For this purpose, in a development of the invention, the coupling recess has provided on it at least one locking bolt which, in a locking state, can be moved inward into the coupling extension, or, the coupling extension has provided in it at least one locking bolt which, in a coupling state, can be moved into a wall of the coupling recess. The movability of the locking bolts is possible preferably approximately or exactly in a direction forming an angle of 90° with the coupling direction. It is preferable if the locking bolts are movable in the radial direction with respect to the coupling extension. The locking bolts make between the coupling devices a connection which is positive in the coupling direction. It is preferable if, in the coupling extension, radially extending recesses are provided, into which locking bolts moving in from outside can engage, in order to make the positive connection. It is particularly preferable, furthermore, if the locking bolts have at least partially a conical shape, so that, by being moved into corresponding recesses of the other coupling device in each case, they come into bearing contact in each case with this and thus make it possible to have a play-free coupling. The movement of the locking bolts is preferably implemented via the action of pneumatic or hydraulic pressure.

In a development of the invention, at least one preferably conically oriented aligning pin is provided on the robot-side coupling device or on the tool-side coupling device. Furthermore, correspondingly to this, at least one aligning recess for receiving the aligning pin is provided on the tool-side coupling device or on the robot-side coupling device. The aligning pin and the aligning recess serve jointly for fixing the coupling devices transversally to the coupling direction. For this purpose, they extend in the coupling direction. The aligning pin, too, is preferably configured conically, so that, in the state in which it is engaged completely into the recess, it makes a play-free or virtually play-free connection. By means of such an aligning pin or a plurality of such aligning pins, in particular, position tolerances of the tool mounted on the feed slide or on the feeding means can be compensated, so that, during coupling, a highly reproducible relative position between the tool and robot arm can be achieved.

In a development of the invention, in each case corresponding connections for liquid, pasty or gaseous work substances and/or materials, electrical connections, signal lines and/or hydraulic or pneumatic connections are provided on the tool-side and the robot-side coupling device. It is thereby possible, in addition to the mechanical coupling of the tool to the robot arm, at the same time also to couple the supply lines to one another. For this purpose, the respective connections are preferably likewise oriented in the coupling direction and arranged correspondingly to one another. The connections may be provided as couplings and binders designed correspondingly to one another. Particularly in the case of the work substances and the materials, in the simplest instance, corresponding line ports may also be provided on both sides, the line ports being surrounded preferably at least on one side by a sealing means, such as a sealing ring, in order to avoid the unwanted escape of the work substances and/or materials in the coupling region.

The invention also relates, furthermore, to a storage device for a tool-changing system of the type described above, which has securing means for securing a robot-side coupling device and feeding means which are designed for generating a relative movement of the robot-side coupling device in the secured state and of a tool-side coupling device with respect to one another.

The invention relates, furthermore, to a method for coupling a tool to a robot arm, the robot arm being moved into the region of fixed securing means, the securing means fixing the robot arm at least in respect of a translational movement in a coupling direction, a feed device relatively movable in the coupling direction with respect to the securing means being moved in relation to the securing means, so that a tool movable by the feed device is moved up to a robot-side coupling device by means of a tool-side coupling device, and the tool-side coupling device being coupled preferably positively to the robot-side coupling device.

The fixed securing means may in this case be fixed in so far as they are arranged in a fixed relative position at least in relation to a stationary section of a feeding means to which the feed device is assigned. Preferably, furthermore, they are in a fixed relative position with respect to a base section of the robot, by means of which the latter is set up at a fixed location.

The particular feature of the method is that the force flux occurring when the coupling device of the tool and the coupling device of the robot arm meet one another does not, at least partially, take place through the fixed base section of the robot. Instead, the force flux takes place directly from the securing means into the feeding means which comprise the feed device. The action of force upon the robot, which could possibly lead to an unwanted displacement of the robot, is thereby reduced or avoided.

BRIEF DESCRIPTION OF THE DRAWINGS

Further advantages and features may be gathered from the claims and from an exemplary embodiment which is illustrated below by means of the drawings in which:

DETAILED DESCRIPTION OF THE EXEMPLARY EMBODIMENT

Figure 1:
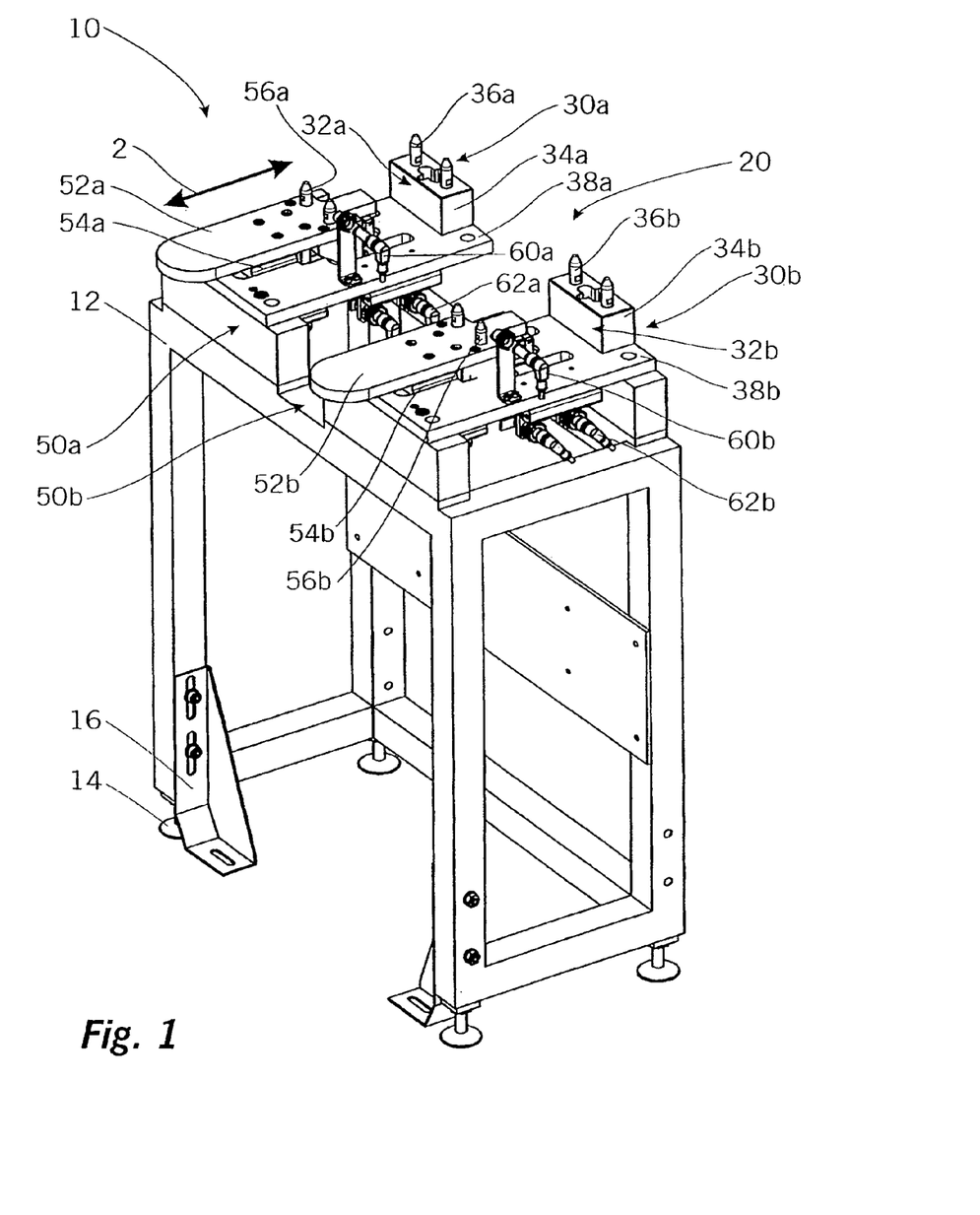
FIG. 1 shows a storage device of a tool-changing system according to the invention for an industrial robot.

FIG. 1 shows a storage device of a tool-changing system according to the invention. This storage device 10 consists of a stand 12 and of the functional components 20 provided directly for the coupling operation. The stand 12 has height-adjustable feet 14 and can be firmly connected to a foundation, for example a hall floor, by screw connections by means of fastening angles 16.

The functional components 20 involved directly in the coupling operation comprise two subassemblies 30a, 30b which are provided in each case for receiving and handling a tool. Each of these subassemblies 30a, 30b has securing means 32a, 32b on its side located on the right in the perspective view of FIGS. 1 to 5. These securing means 32a, 32b comprise in each case a support block 34a, 34b, from which in each case two fixing pins 36a, 36b extend vertically upward. The support blocks 34a, 34b and, together with them, the fixing pins 36a, 36b firmly connected to them are in each case fastened firmly to base plates 38a, 38b which, in turn, are connected firmly to the stand 12.

Feeding means 50a, 50b are provided on the left side of the securing means 32a, 32b. These feeding means 50a, 50b comprise, in particular, in each case a feed slide 52a, 52b which is movable linearly in a feed direction 2. The feed slides 52a, 52b can be displaced separately from one another in each case by means of a pneumatic cylinder 54a, 54b. The feed slides 52a, 52b have in each case a flat support surface, from which in each case two fixing pins 56a, 56b extend vertically upward in a similar way to the support blocks 34a, 34b.

Each feed slide 52 is assigned, overall, three sensors 60a, 60b, 62a, 62b, the sensors 60a, 60b being designed in each case as optical sensors, by means of which it can be determined whether a tool is mounted on the feed slides 52. The sensors 62a, 62b, by contrast, are designed as inductive sensors, by means of which the position of the feed slide can be detected.

In a way not illustrated, these sensors 60a, 60b, 62a, 62b are connected to a control apparatus which also assumes the control of a robot assigned to the storage device and of the pneumatic cylinders 54a, 54b.

Figure 2:
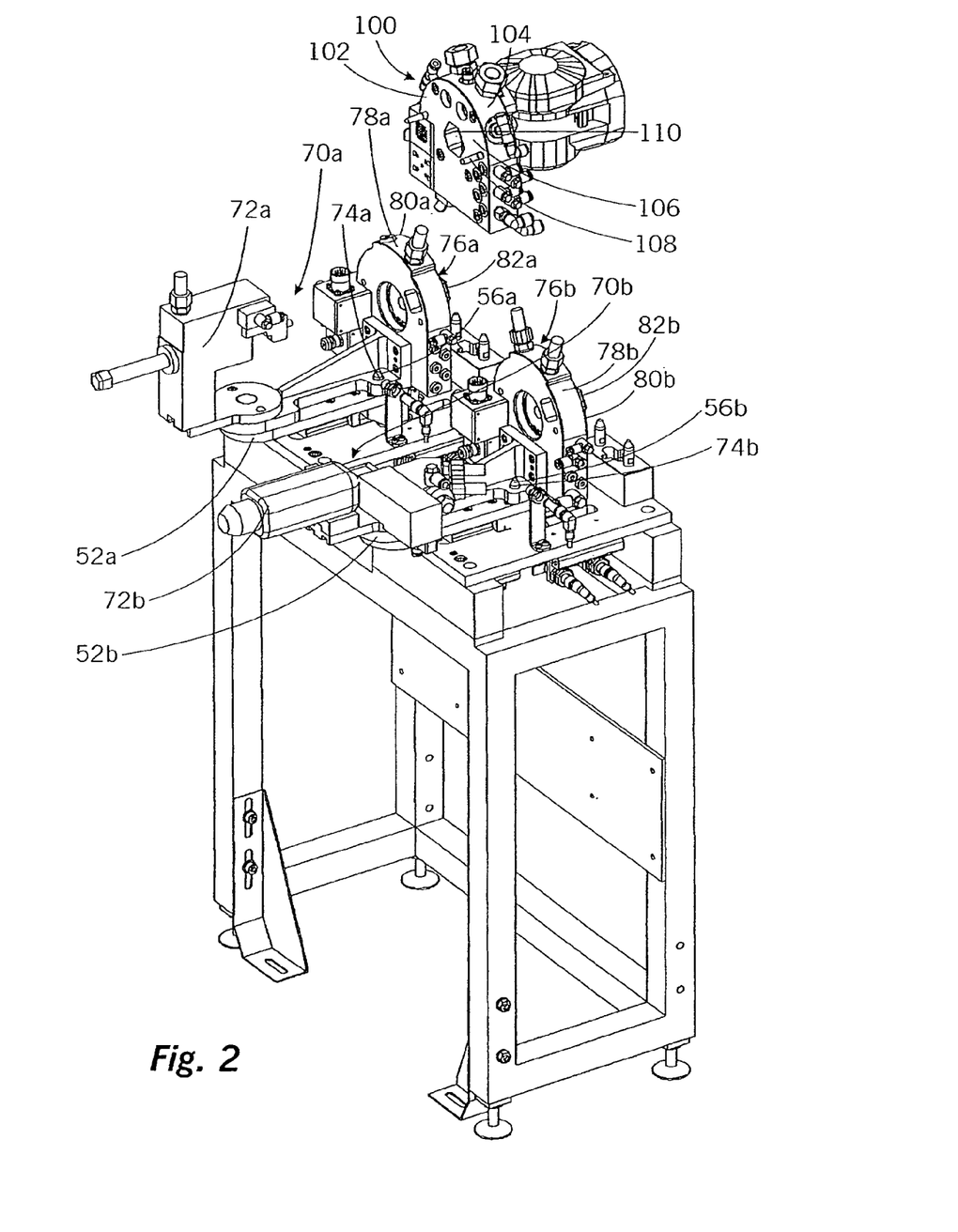
FIG. 2 shows the overall tool-changing system for an industrial robot, with the storage device illustrated in FIG. 1, equipped with two tools, and also with a robot-side coupling device.

FIG. 2 shows the storage device of FIG. 1 in an equipped state. In this equipped state, a tool 70a, 70b is in each case provided on each of the feed slides 52a, 52b, while, in the present instance, which is merely a preferred example, the tools are designed as discharge tools for pasty media. The tools 70a, 70b have in each case a series of tool-specific components 72a, 72b. Both tools 70a, 70b have in common the fact that they have in each case two fixing bores 74a, 74b on a boom, in each case only one of these fixing bores 74a, 74b being visible in FIG. 2. The fixing pins 56a, 56b of the feed slides 52a, 52b project through these fixing bores 74a, 74b and lead to a stable horizontally positive coupling of the tools 70a, 70b to the feed slides 52a, 52b.

The tools 70a, 70b have in common, furthermore, the fact that they have a coupling device 76a, 76b in each case on their right side facing the securing means 32a, 32b. The coupling devices 76a, 76b of the tools 70a, 70b are in each case designed as vertically standing coupling plates, on the curved side surfaces 78a, 78b of which are provided a multiplicity of connections for compressed air, materials and work substances. These connections can be connected, in a way not illustrated in any more detail, to the tool-specific components 72a, 72b of the tools 70a, 70b by means of cable and hose connections. Within the coupling devices 76a, 76b, these connections are connected by means of connecting ducts connecting lines to connections which point in the direction of the support blocks 34a, 34b in a way which cannot be gathered from FIG. 2. These connections are provided in each case on an at least partially planar contact surface 80a, 80b of the coupling device 76a, 76b, said contact surface pointing in the direction of the securing means 32a, 32b. Furthermore, the largely planar contact surface 80a, 80b of the coupling devices 76a, 76b has in each case a coupling extension 82a, 82b which has approximately the shape of a hexagon and which likewise extends in the direction of the securing means 32a, 32b from the coupling surfaces 80a, 80b.

Furthermore, in the illustration of FIG. 2, part of a robot arm with a robot-side coupling device 100 provided on the robot arm is illustrated. This robot-side coupling device 100 likewise has an essentially vertically oriented coupling plate 102. In a similar way to the tool-side coupling device 76a, 76b, a multiplicity of connections for work substances, materials, compressed air and electrical signals are provided on a curved surface 104 of this coupling device 100. In a way not illustrated in more detail, these connections are connected to corresponding supply cables and lines on the robot. The respective connections issue in the region of a planar contact surface 106 in a similar way to the tool-side coupling device, the arrangement of the connections which issue there correspondingly mirror-symmetrically to the arrangement, not illustrated, of the connections on the respective planar contact surface 80a, 80b of the tool-side coupling devices 76a, 76b.

Likewise correspondingly to aligning recesses, not illustrated, in the region of the planar contact surfaces 80a, 80b of the tool-side coupling devices 76a, 76b, aligning pins 108 are provided on the planar contact surface 106 of the robot-side coupling device 100.

Correspondingly to the coupling extensions 82a, 82b, in the robot-side coupling device 100, a coupling recess 110 is provided, which is dimensioned such that it can receive the coupling extensions 82a, 82b.

In the illustration in FIG. 2, the robot arm, together with the robot-side coupling device 100, is already located above the storage device 10 having the tools 70a, 70b mounted on it. The coupling device is moved downward out of this position of FIG. 2 by means of the freedom of movement of the robot arm, so that the coupling device 100 comes to lie on the left support block 34a. In this put-in-place position illustrated in FIG. 3, the fixing pins 36a on the support block 34a extend into corresponding fixing recesses, not illustrated, on the underside of the robot-side coupling device 100. The result of this is that, in the position illustrated in FIG. 3, there is a positive connection between the storage device 10 and the robot-side coupling device 100 in the coupling direction 2. The robot-side coupling device 100 can consequently be removed from the engagement of the fixing pins 36a again solely as a result of vertical displacement.

Figure 3:
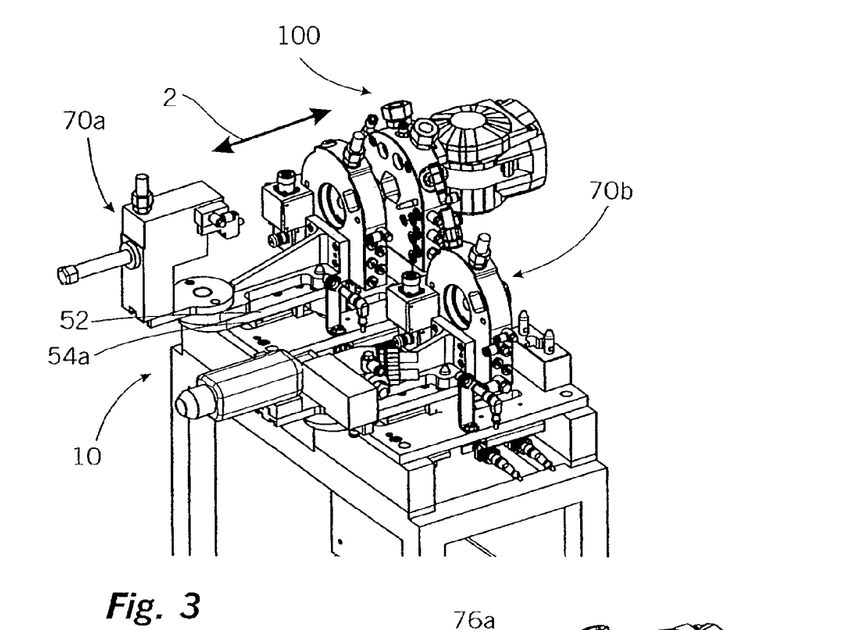
FIGS. 3 to 5 show the operation of coupling the robot-side coupling device to one of the tools provided on the storage device.

After the intermediate position illustrated in FIG. 3 is reached, the feed slide 52a is displaced to a coupling direction 2 in the direction of the robot-side coupling device by the actuation of the pneumatic cylinder 54a. The aligning pins 108 on the robot-side coupling device and the corresponding aligning recesses, not illustrated, on the tool-side coupling device in this case lead to an exact alignment of the tool and of the robot arm in relation to one another. As soon as the contact surface 80a of the tool-side coupling device 76a in this case butts against the contact surface 106 of the robot-side coupling device 100, the tool-side coupling device 76a is pressed against the robot-side coupling device 100. The force acting on the robot-side coupling device 100 is in this case not introduced into the robot, but is introduced into the stand 12 via the fixing pins 36a and the support block 34a.

Figure 4:
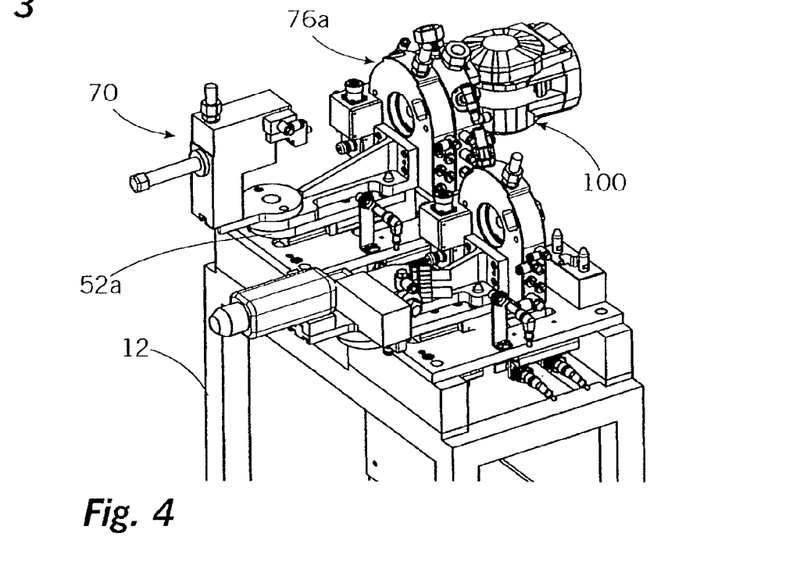
Figure 5:
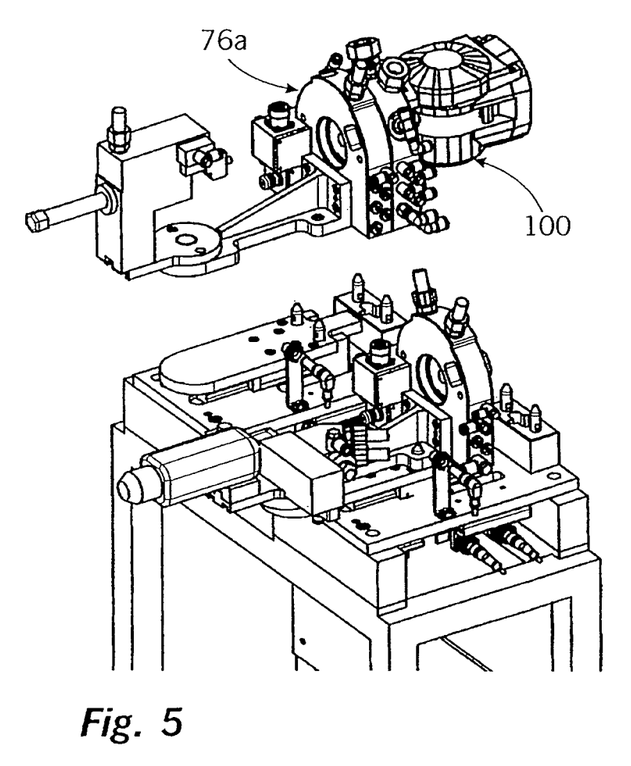

In the position consequently reached, which is illustrated in FIG. 4, after the desired relative position between the robot-side coupling device 100 and the tool-side coupling device 76a is reached, an interlocking of the coupling devices 76a, 100 is carried out, which is explained in more detail below with reference to FIG. 6. After this interlock has been made, the coupling devices 76a, 100 are firmly connected to one another. The respective ducts for the transport of work substances, materials and pneumatic and hydraulic medium and also the electrical lines are likewise contacted in this state.

Starting from the position of FIG. 4, the robot arm, together with the tool 70a then coupled to it, is subsequently raised vertically, so that the tool 70a is released from the feed slide 52a. The robot, together with the then coupled tool, thereby achieves the desired state of use illustrated in FIG. 5.

Figure 6:
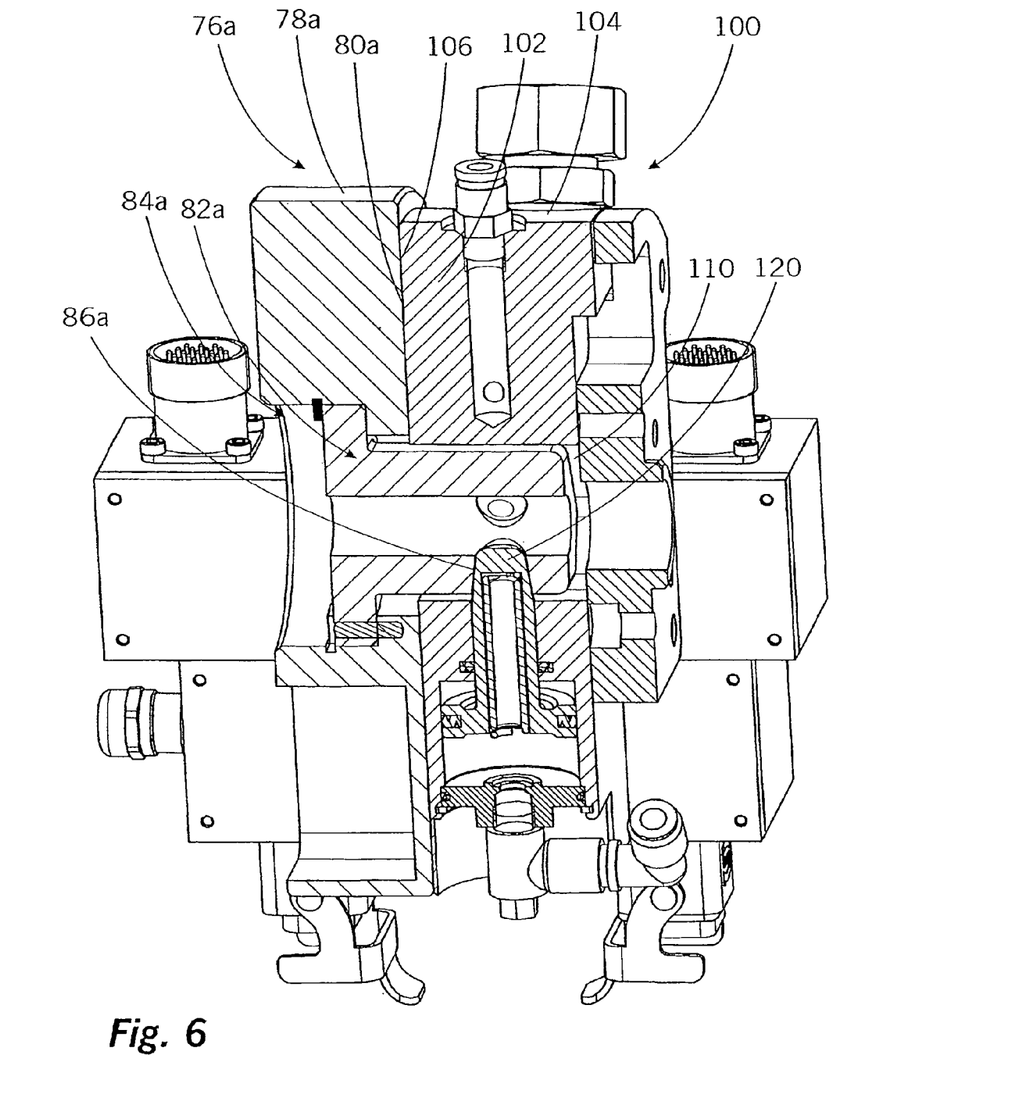
FIG. 6 shows a sectional illustration of the robot-side and tool-side coupling devices.

FIG. 6 shows a sectional illustration of the coupling devices 76a, 100 of the tool 70a and of the robot arm respectively, in the coupled state. In the tool-side coupling device 76a, a circular perforation 84a is provided, into which the coupling extension 82a is pushed and is fixed there fixedly in terms of rotation. The coupling extension extends in the direction of the robot-side coupling device 100 and in this case projects beyond the contact surface 80a of the tool-side coupling device 76a. In a section, extending beyond the contact surface 80a, of the coupling extension 82a, overall three recesses 86a tapering conically inward are provided on the outside. In the coupled state illustrated in FIG. 6, in each case a locking bolt 120 is pushed into these recesses 86, the locking bolts 120 in each case being mounted radially displaceably in the robot-side coupling device and in each being capable of being acted upon hydraulically with force radially inward.

The coupling mechanism illustrated ensures a firm and operationally reliable connection of the coupling devices of the robot and of the tool.

The invention claimed is:

1. A tool-changing system for an industrial robot having a robot arm, comprising:
   a robot-side coupling device provided on said robot arm;
   a tool having a tool-side coupling device thereon;
   a tool storage device having thereon a securing means configured for fixedly holding said tool with said tool-side coupling device thereto; and
   a feed slide mounted on said tool storage device and said feed slide being configured to support said tool with said tool-side coupling device thereon;
   said feed slide providing movement of the tool-side coupling device in a coupling direction;
   said movement being provided such that the tool-side coupling device is moved toward the robot-side coupling device and such that the tool-side coupling device and robot-side coupling device are brought into engagement with each other;
   said tool-side coupling device and said robot-side coupling device each being configured for coupling together in response to said tool-side coupling device and said robot-side coupling device being brought into engagement with each other;
   said securing means securely holding said robot-side coupling device stationary as the tool-side coupling device is moved by said feed slide to cause said engagement to occur between said tool-side coupling device and said robot-side coupling device to thereby facilitate coupling together of said robot-side coupling device and said tool-side coupling device; and
   said securing means comprising a support block and two fixing pins, the two fixing pins extending from a surface of the support block in a perpendicular direction toward the robot-side coupling device when the robot-side coupling device is engaged with the tool-side coupling device fixedly held in the tool storage device, with the perpendicular direction being perpendicular to the coupling direction, thereby preventing a force acting on the robot-side coupling device in response to said engagement by said tool-side coupling device to said robot-side coupling device from being introduced into the robot arm.

2. The tool-changing system according to claim 1, wherein said feed slide is configured for a linear movement in said coupling direction.

3. The tool-changing system according to claim 1, wherein said fixing pins of said securing means are configured as elevations thereon while said robot-side coupling device has recesses configured to receive said elevations therein.

4. The tool-changing system according to claim 1, wherein said feed slide has elevations while and said tool-side coupling device has recesses configured to receive said elevations therein.

5. The tool-changing system according to claim 4, wherein said recesses are fixing bores thereby facilitating relative movement between said feed slide and said tool in only one direction that differs from said coupling direction.

6. The tool-changing system according to claim 1, wherein said tool-side coupling device has a coupling extension thereon while said robot-side coupling device has a coupling recess which is open in said coupling direction and is configured to receive said coupling extension therein.

7. The tool-changing system according to claim 6, wherein said coupling extension is provided with an extending bore and said coupling recess includes at least one locking bolt configured to move into and out of said extending bore, a movement of said at least one locking bolt into said extending bore resulting in a locking of said tool-side coupling device to said robot-side coupling device.

8. The tool-changing system according to claim 1, wherein at least one conically oriented aligning pin is provided on said robot-side coupling device while said tool-side coupling device has at least one aligning recess for receiving said at least one conically oriented aligning pin therein.

9. The tool-changing system according to claim 1, wherein connections for at least one of liquid, pasty or gaseous work substances and electrical connections and hydraulic or pneumatic fluids are provided on said tool-side coupling device and said robot-side coupling device.

* * * * *